US008628276B2

(12) United States Patent
Delves et al.

(10) Patent No.: US 8,628,276 B2
(45) Date of Patent: Jan. 14, 2014

(54) FLUIDISING APPARATUS WITH SWIRL-GENERATING MEANS

(75) Inventors: James Edward Delves, Bristol (GB); Neil Keith Young, Bristol (GB); David Oliver Drew, Bristol (GB)

(73) Assignee: Cameron International Corporation, Houston, TX (US)

(*) Notice: Subject to any disclaimer, the term of this patent is extended or adjusted under 35 U.S.C. 154(b) by 1711 days.

(21) Appl. No.: 10/514,960

(22) PCT Filed: May 30, 2003
(Under 37 CFR 1.47)

(86) PCT No.: PCT/GB03/02370
§ 371 (c)(1),
(2), (4) Date: Aug. 25, 2006

(87) PCT Pub. No.: WO03/101868
PCT Pub. Date: Dec. 11, 2003

(65) Prior Publication Data
US 2008/0044238 A1      Feb. 21, 2008

(30) Foreign Application Priority Data
May 31, 2002    (GB) .................................. 0212728.0

(51) Int. Cl.
    *B65G 53/10*      (2006.01)
    *B01J 8/00*       (2006.01)
    *B65G 53/12*      (2006.01)

(52) U.S. Cl.
    CPC ............... *B01J 8/0025* (2013.01); *B65G 53/12* (2013.01)
    USPC .......................................... 406/143; 406/146

(58) Field of Classification Search
    USPC .............. 406/86, 92, 137, 141–143, 146, 197
    See application file for complete search history.

(56) References Cited

U.S. PATENT DOCUMENTS

| | | | | |
|---|---|---|---|---|
| 1,319,193 A | * | 10/1919 | Von Porat | 406/133 |
| 1,337,738 A | * | 4/1920 | Von Porat | 406/137 |
| 1,357,663 A | * | 11/1920 | Von Porat | 406/143 |
| 1,364,532 A | * | 1/1921 | Von Porat | 406/142 |
| 1,749,817 A | * | 3/1930 | Hermsdorf | 406/134 |
| 2,255,438 A | * | 9/1941 | Robinson | 406/137 |
| 2,587,669 A | * | 3/1952 | Weinrich | 208/92 |
| 2,671,102 A | * | 3/1954 | Jewell | 518/709 |
| 2,673,764 A | * | 3/1954 | Cummings et al. | 406/143 |
| 2,686,083 A | * | 8/1954 | Hampton et al. | 406/136 |
| 2,707,132 A | * | 4/1955 | Baresch | 406/14 |
| 2,734,781 A | * | 2/1956 | Fowler, Jr. | 406/136 |

(Continued)

FOREIGN PATENT DOCUMENTS

| | | |
|---|---|---|
| DE | 1806477 | 2/1960 |
| FR | 1130823 A | 2/1957 |
| GB | 2118512 A | 11/1983 |
| LU | 88336 | 2/1995 |

*Primary Examiner* — William R Harp
(74) *Attorney, Agent, or Firm* — Mossman Kumar & Tyler PC

(57) ABSTRACT

According to the present invention there is provided fluidizing apparatus comprising: a flow chamber 2 having a fluid inlet 4 and a fluid outlet 6; means 18 for establishing a swirling flow in a fluid passing out of the fluid outlet; and a transport outlet 30 for transporting fluidized material away from the flow chamber 2, the transport outlet 30 being situated externally of the flow chamber 2.

19 Claims, 2 Drawing Sheets

(56) References Cited

U.S. PATENT DOCUMENTS

| | | | | |
|---|---|---|---|---|
| 2,758,881 A | * | 8/1956 | Lassiat | 406/143 |
| 2,758,883 A | * | 8/1956 | Kollgaard | 406/123 |
| 2,758,884 A | * | 8/1956 | Weinrich | 406/123 |
| 2,770,503 A | * | 11/1956 | Bourguet | 406/143 |
| 2,800,432 A | * | 7/1957 | Weinrich | 208/74 |
| 2,813,755 A | * | 11/1957 | Payne et al. | 406/132 |
| 2,826,460 A | * | 3/1958 | Cameron et al. | 406/142 |
| 2,850,329 A | * | 9/1958 | Pyle et al. | 406/142 |
| 2,878,076 A | * | 3/1959 | Milliken, Jr. | 406/142 |
| 2,909,392 A | * | 10/1959 | Rees et al. | 406/142 |
| 2,972,503 A | * | 2/1961 | Brennan | 406/142 |
| 2,977,154 A | * | 3/1961 | Bourguet et al. | 406/143 |
| 3,097,828 A | * | 7/1963 | Grun | 366/106 |
| 3,179,378 A | | 4/1965 | Zenz et al. | |
| 3,185,529 A | * | 5/1965 | Vaughan et al. | 406/126 |
| 3,351,391 A | * | 11/1967 | Green | 406/138 |
| 3,366,277 A | * | 1/1968 | Barber | 222/642 |
| 3,463,553 A | * | 8/1969 | Toth et al. | 406/138 |
| 4,053,142 A | * | 10/1977 | Johannes | 366/165.1 |
| 4,097,092 A | * | 6/1978 | Lapple | 406/93 |
| 4,265,572 A | * | 5/1981 | Bourdois et al. | 406/114 |
| 4,502,819 A | * | 3/1985 | Fujii et al. | 406/14 |
| 4,662,799 A | * | 5/1987 | Paul et al. | 406/14 |
| 4,978,251 A | * | 12/1990 | Drobadenko et al. | 406/50 |
| 5,518,529 A | * | 5/1996 | Molnar | 95/271 |
| 5,853,266 A | * | 12/1998 | Parkinson et al. | 406/143 |
| 2008/0219779 A1 | | 9/2008 | Parkinson | |

* cited by examiner

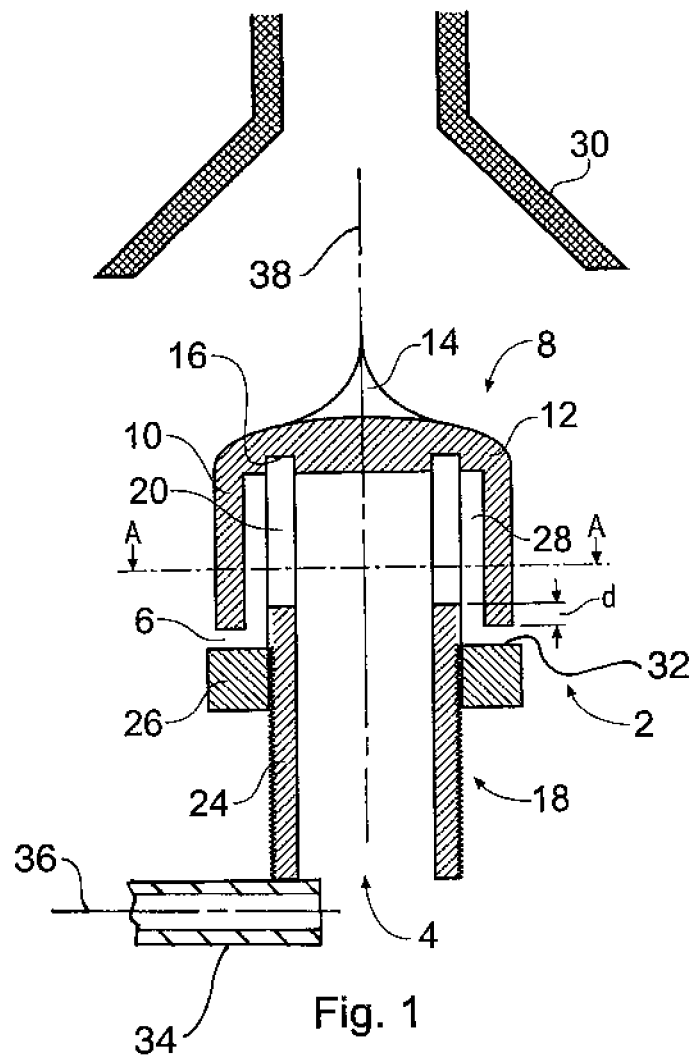
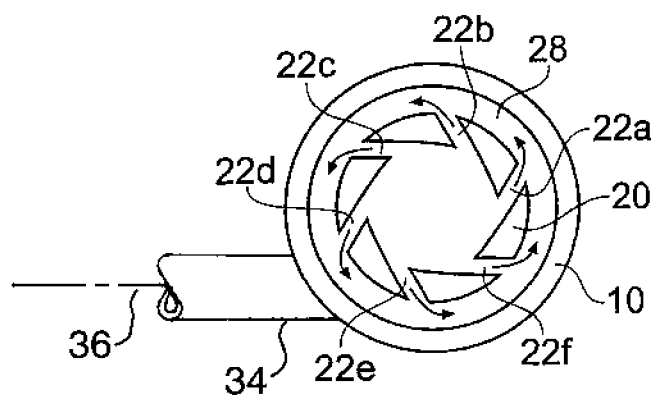

US 8,628,276 B2

FLUIDISING APPARATUS WITH SWIRL-GENERATING MEANS

This invention relates to fluidising apparatus which can be used, for example, to fluidise settled solids, within a tank at atmospheric pressure or a pressure vessel at greater than atmospheric pressure in order to cause the solids to form a slurry which can be discharged from the tank or vessel.

The slurry may pass into a slurry hydrotransport pipeline, designed to deliver the slurry at a required concentration over a required distance or static head with no moving parts subjected to abrasion or erosion. Alternatively, it may be fed directly into a slurry pump at a constant relative density or an inductor/jet pump, or other required processing system.

BACKGROUND OF THE INVENTION

U.S. Pat. Nos. 4,978,251, 4,952,099, 4,992,006 and 5,853,266, disclose fluidising units of the type comprising a supply duct which is arranged to be fed with liquid under pressure, and a discharge duct within the supply duct, and projecting beyond the outlet of the supply duct.

A particular disadvantage of the fluidising units described in the above mentioned patents is that the discharge duct is always within the slurry duct. This can lead to a requirement to have large units and in particular large nozzles in pressure vessels etc. As the fluidising units may require inspection and/or maintenance the units in practice are normally designed to be removable, through nozzles or manways. The larger the dimension of the fluidising unit the more demanding the design of the pressure vessel becomes.

It has also been observed in practice that a large fluidising unit installed inside a pressure vessel can cause a hold-up of material on its top or within the annulus, created by the fluidising unit and its pressure vessel, by the formation of a bridge of solids.

STATEMENT OF INVENTION

According to the present invention there is provided fluidising apparatus comprising:
a flow chamber having a fluid inlet and a fluid outlet;
means for establishing a swirling flow in a fluid passing out of the fluid outlet; and
a transport outlet for transporting fluidised material away from the flow chamber, the transport outlet being situated externally of the flow chamber.

Preferably, the transport outlet is situated close to the flow chamber. Preferably, the transport outlet is situated on a central axis of the flow chamber. For example, the flow chamber may be located with its central axis substantially vertical and the transport outlet may be situated directly above or directly below the flow chamber.

Preferably, the said means for establishing a swirling flow comprises an offset fluid inlet with a central axis which does not intersect the central axis of the flow chamber.

Preferably, the flow chamber comprises a housing and a flow guide, the flow guide being situated at least partially within the housing. Preferably, the housing comprises a cap which fits over the flow guide. Preferably, the flow guide is substantially helical. Alternatively, the flow guide may be substantially tubular and has a side wall in which is formed an opening, the opening extending through the side wall in a direction which is offset from a radial direction of the flow chamber. Most preferably, the opening extends substantially tangentially through the side wall of the flow guide. Preferably, a plurality of openings are formed through the flow guide. The openings may be in the form of tangential slots.

Preferably, the flow guide is closed off at its outlet end. Preferably, an end of the flow chamber is closed off by an end wall 32. The end wall 32 may be supported on the flow guide and may extend radially outwardly beyond the side wall of the flow guide to form a flange 26. The flange 26 assists in directing the flow away from the flow guide. Preferably, the fluid outlet from the flow chamber is annular and is defined between the flange and the side wall of the flow chamber. Preferably, the flange can be moved relative to the flow chamber along the central axis of the flow chamber, to adjust the flow rate through the flow chamber. Preferably, the flange can be moved into abutment with a bottom edge of the flow chamber, thereby closing off the fluid outlet from the flow chamber when it is not in use.

Preferably, the portion of the flow chamber which is adjacent the transport outlet is profiled in order to encourage a stable fluid regime between the flow chamber and the transport outlet. Preferably, this portion is generally in the shape of a cone with a concave side wall. For example, it may taper parabolically from its base to its tip.

Preferably the fluidising apparatus is operated in a container, the only outlet from the container comprising the transport outlet.

Compared with the prior art apparatus, fluidising apparatus according to the present invention can have smaller inlet and discharge nozzles, avoid bridging of solids in the vessel, be capable of using any fluid as a driving force, be easily accessible and economically viable to replace. It can also be provided with a sacrificial transport outlet in the form of a discharge duct, which avoids errosional damage to pressure vessel components.

BRIEF DESCRIPTION OF THE DRAWINGS

For a better understanding of the present invention and to show how it may be carried into effect, reference will now be made by way of example to the accompanying drawings, in which:—

FIG. 1 is a longitudinal cross-section through a fluidising apparatus;

FIG. 2 is a cross-section on line AA in FIG. 1;

DETAILED DESCRIPTION OF THE PREFERRED EMBODIMENTS

Figure 3:
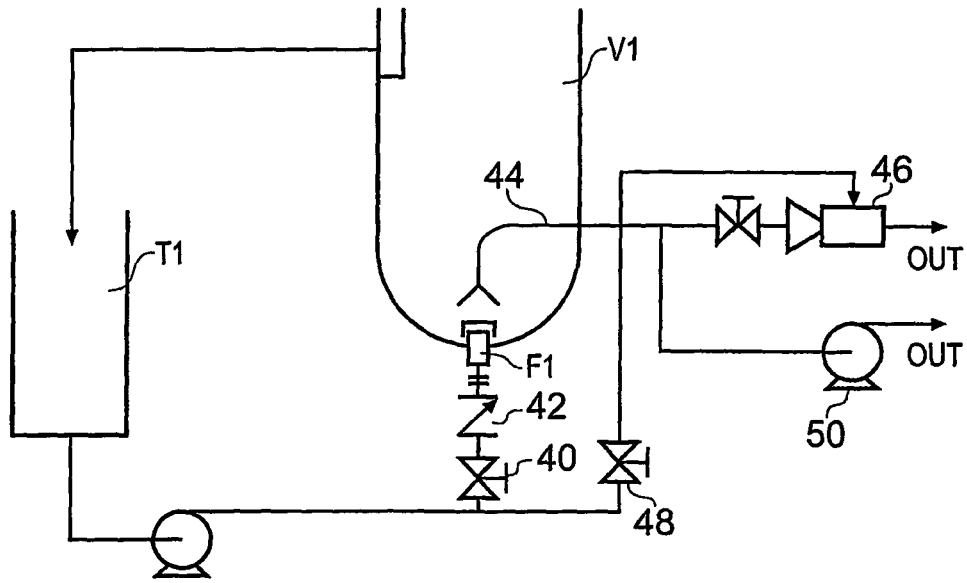
FIG. 3 is a schematic representation of an atmospheric system using the fluidising apparatus of FIG. 1.

FIGS. 1 and 2 illustrate a fluidising apparatus comprising a flow chamber 2 having a fluid inlet 4 and a fluid outlet 6. The flow chamber 2 comprises a housing in the form of a cap 8 having a side wall 10 and a top 12 which in the region 14 is generally in the shape of a cone with a concave side wall. The underside of the top 12 is provided with an annular recess 16 in which is located a cylindrical flow guide 18. As best shown in FIG. 2, the upper portion 20 of the flow guide 18 is provided with a series of tangential slots 22a to 22f. The lower portion 24 of the flow guide 18 has an external thread which cooperates with an internal thread formed in an annular flange 26.

A fluid outlet 6 is defined between the side wall 10 of the cap 8 and the end wall 32 of flange 26 and an annular flow passage 28 is defined between the side wall 10 of the cap 8 and the upper portion 20 of the flow guide 18. The annular flow passage 28 is continuous with the fluid outlet 6, so that the fluid inlet 4 communicates with the fluid outlet 6 by means of the tangential slots 22a to 22f and the flow passage 28. Directly above the flow chamber 2 is located a transport outlet 30.

In use of the fluidising unit in a pressurised system, fluid under pressure enters the fluidising unit through the fluid inlet 4, passes down the flow guide 18 and exits the flow guide tangentially via the slots 22a to 22f (as the open end of the flow guide 18 is closed by the cap 8). The cap 8 also acts as a swirl enhancer and is positioned such that its side wall. 10 forms one side of the said annular flow passage 28 around the tangential slots 22a to 22f. The cap 8 is longer than the slots 22a to 22f, such that it overlaps the slots by an amount d and defines the fluid outlet 6 by which the concentrated swirling fluid exits the flow chamber 2. The profiled region 14 of the cap 8 is shaped in order to encourage a stable fluid regime above the flow chamber 2. The swirling flow exiting the flow chamber 2 fluidises, mixes and breaks up settled or partly settled solids adjacent to the flow chamber 2, thereby forming a mobile slurry, which is directed towards the transport outlet 30 from where it can be directed to a slurry pipeline or for further processing. The transport outlet 30 may, for example, comprise a substantially horizontal pipe or a pipe with a bend (preferably a 90 degree bend), and it may be funnelled, such that it flares outwardly towards the flow chamber 2.

The fluidising apparatus may be fixed within a vessel or tank at any orientation, passing through the vessel or tank wall by means of a normal flanged nozzle or threaded inlet boss, whereby the inlet to the fluidising apparatus is fed by a fluid under pressure. The outlet 6 of the fluidising apparatus sets up a swirl that can be created by, for example, a tangential or offset fluid inlet 34 or inlets, tangential slots or holes in a flow guide, or an auger unit within the inlet pipe 4 or flow chamber 2. Offset fluid inlet 34 has a central axis 36 which does not intersect the central axis 38 of the flow chamber 2. The swirl from the fluidising apparatus mobilises any settled or partly settled solids into a slurry mixture. In the case of a pressurised unit the only exit from the vessel is a separate transport outlet 30 which is preferably situated directly above or under the fluidising unit. The prepared slurry then reports via the transport outlet 30 to a slurry pipeline, pump or process system as may be required. In an atmospheric system the outlet duct can be attached to a pump, or inductor to create the pressure differential required to transport the slurry to its required destination.

FIG. 3 shows an atmospheric system incorporating a fluidising apparatus in accordance with the present invention.

Solids to be transported are loaded into V1. Should fluids be present in V1 these may be displaced by incoming solids and will report to the Tank T1 by means of an overflow.

When V1 is filled with solids the pump is started and the valve 40 opens to allow fluids to pass through non-return valve 42 into fluidising unit F1.

Solids will be fluidised and discharged through pipe 44, due to the vessel operating at atmospheric pressure the slurry will discharge at an equal or less pressure, controlled by the hydrostatic head of solids/water/slurry available in V1.

The discharging slurry can be fed into an inductor 46 to provide motive force to deliver the slurry over a short distance. Feed to the inductor may be from a separate feed or from the main pump by opening valve 48. Alternatively the exiting slurry from 44 may be fed into the suction of a slurry pump 50 to provide motive force without further dilution. Using this method will in most cases reduce the need for large mixing tanks normally required to feed slurry pumps.

Figure 4:
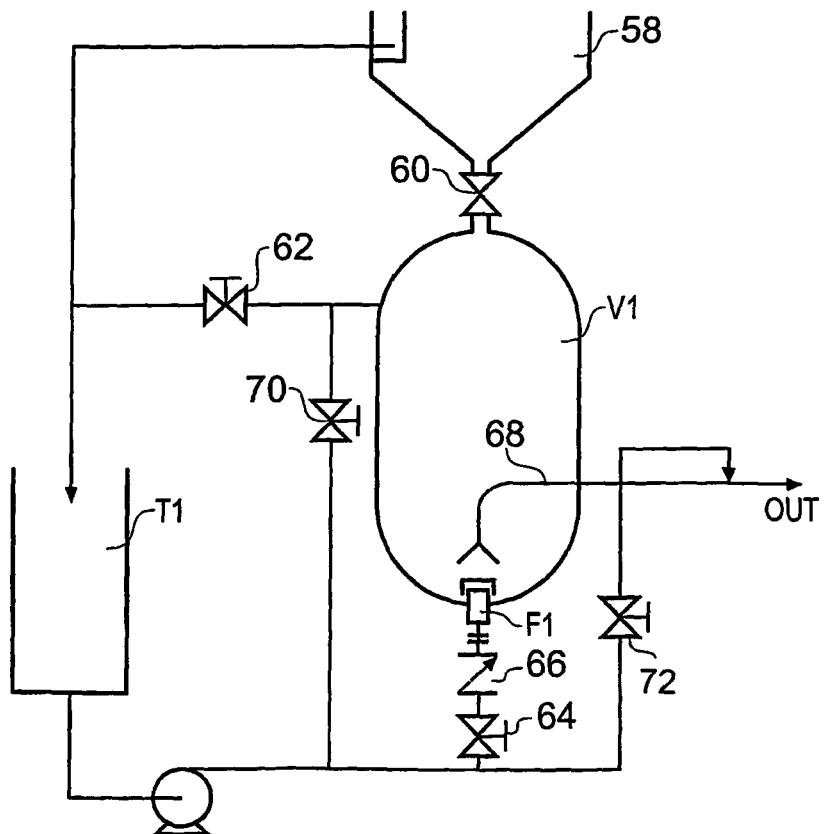
FIG. 4 is a schematic representation of a pressurised system using the fluidising apparatus of FIG. 1.

FIG. 4 shows a pressurised system using a fluidising apparatus in accordance with the present invention.

Solids to be transported are loaded into the vessel via a hopper 58 and valve 60. Fluids in vessel V1 are displaced by incoming solids and report to the feed tank T1 via valve 62.

When the vessel is filled with solids, valves 60 and 62 are closed together with all other valves.

The pump is started and valve 64 is opened to allow fluid to pass non-return valve 66 and to enter V1 via fluidising unit F1 to pressurise V1 and solids will discharge as a slurry through the discharge line 68. Should the slurry be too dilute then valve 70 may be opened to cause partial flow to the top of vessel V1 to compact the solids and cause greater concentration of solids in the slurry discharge.

In the event that the slurry is too concentrated valve 72 is opened to cause the discharging slurry to be diluted to suite the process conditions. This can be pre-set or can be operated whilst slurry is discharging until the set point is reached.

Alternatively valve 70 may be automatic and opening set by using a signal from a mass density meter installed in the slurry discharge line.

The invention claimed is:

1. A fluidising apparatus comprising:
   a flow chamber having a fluid inlet and a fluid outlet in which the flow chamber is closed off at its outlet end by an end wall, the flow chamber further comprising a housing and a flow guide, the flow guide being situated at least partially within the housing, where the flow guide is substantially tubular and has a side wall in which is formed at least one opening for establishing a swirling flow in a fluid passing out of the fluid outlet, in which the housing comprises a cap which fits over the flow guide, where the end wall is perpendicular to the flow guide; and
   a transport outlet for transporting fluidised material away from the flow chamber, the transport outlet being situated externally of the flow chamber.

2. Fluidising apparatus as claimed in claim 1, in which the transport outlet is situated close to the flow chamber.

3. Fluidising apparatus as claimed in claim 1 in which the transport outlet is situated on a central axis of the flow chamber.

4. Fluidising apparatus as claimed in claim 1 in which the flow chamber is located with its central axis substantially vertical and the transport outlet is situated adjacent the flow chamber.

5. Fluidising apparatus as claimed in claim 1 in which the said opening for establishing a swirling flow comprises an offset fluid inlet with a central axis which does not intersect the central axis of the flow chamber.

6. Fluidising apparatus as claimed in claim 1 in which the flow guide is substantially helical.

7. Fluidising apparatus as claimed in claim 1, in which the opening extends through the side wall of the flow guide in a direction which is offset from a radial direction of the flow chamber.

8. Fluidising apparatus as claimed in claim 7, in which the opening extends substantially tangentially through the side wall of the flow guide.

9. Fluidising apparatus as claimed in claim 1 in which there are a plurality of openings formed through the flow guide.

10. Fluidising apparatus as claimed in claim 9, in which the openings are in the form of tangential slots.

11. Fluidising apparatus as claimed in claim 1, in which the end wall is supported on the flow guide and extends radially outwardly beyond the side wall of the flow guide to form a flange.

12. Fluidising apparatus as claimed in claim 11, in which the end wall is threaded onto the flow guide.

13. Fluidising apparatus as claimed in claim 12, in which the fluid outlet from the flow chamber is annular and is delimited on one side by the flange.

14. Fluidising apparatus as claimed in claim 12 in which the flange is movable relative to the housing of the flow chamber along the central axis of the flow chamber.

15. Fluidising apparatus as claimed in claim 11 in which the flange can be moved into abutment with a bottom edge of the housing of the flow chamber, thereby closing off the fluid outlet from the flow chamber.

16. Fluidising apparatus as claimed in claim 1 further comprising a portion of the flow chamber adjacent to the transport outlet, which portion is profiled in order to encourage a stable fluid regime between the flow chamber and the transport outlet.

17. Fluidising apparatus as claimed in claim 16, in which the said portion is generally in the shape of a cone with a concave side wall.

18. A container comprising
the fluidising apparatus of claim 1 where the only outlet from the container is the transport outlet, and one or more other openings which are closed during operation of the fluidising apparatus.

19. A container comprising:
a wall; and
a fluidising apparatus passing through the wall comprising:
  a flow chamber having a fluid inlet and a fluid outlet, the flow chamber further comprising a housing and a flow guide, the flow guide being situated at least partially within the housing, where the flow guide is substantially tubular and has a side wall in which is formed at least one opening for establishing a swirling flow in a fluid passing out of the fluid outlet, in which the housing comprises a cap which fits over the flow guide in which the flow chamber is closed off at its outlet end by an end wall, where the end wall is perpendicular to the flow guide; and
  a transport outlet for transporting fluidised material away from the flow chamber, the transport outlet being situated externally of the flow chamber.

* * * * *